No. 670,125. Patented Mar. 19, 1901.
J. F. WILLIAMS.
FOLDING BICYCLE SUPPORT.
(Application filed Mar. 29, 1900.)
(No Model.) 3 Sheets—Sheet 2.
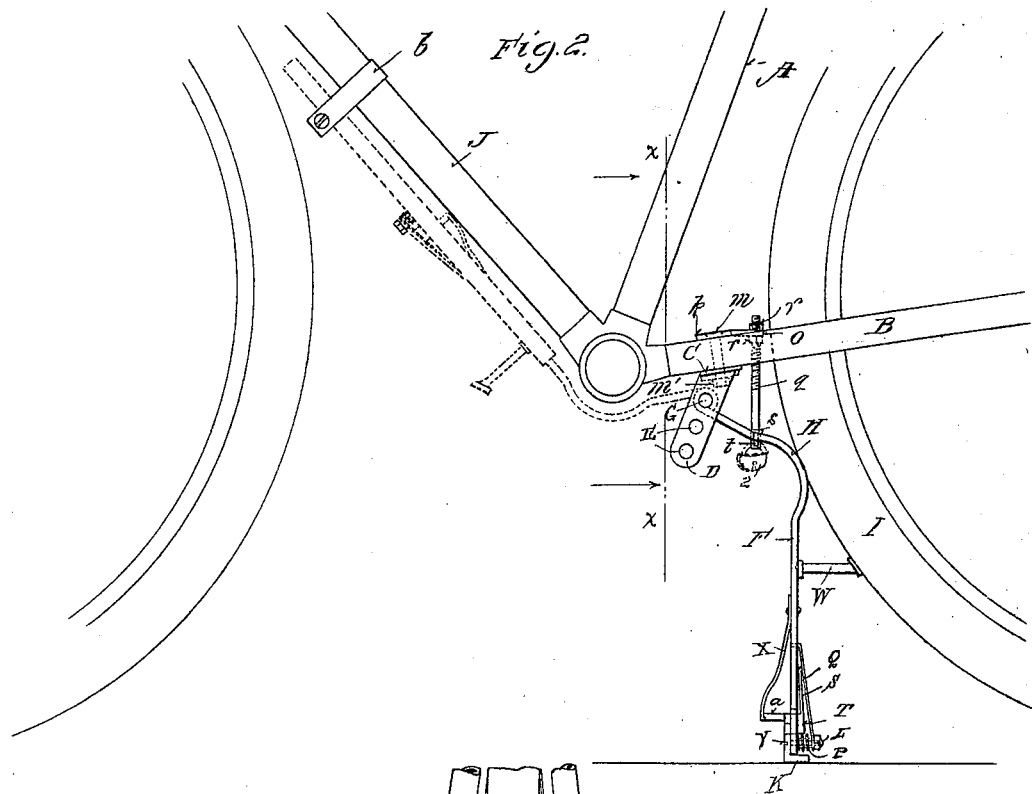
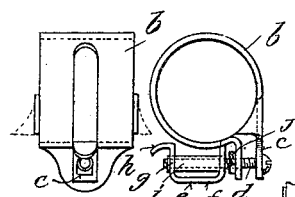
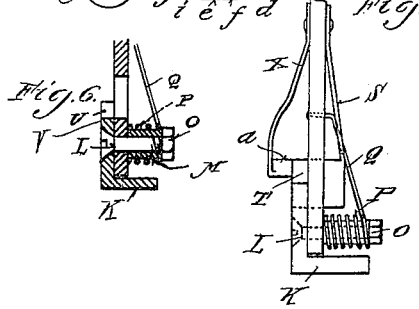
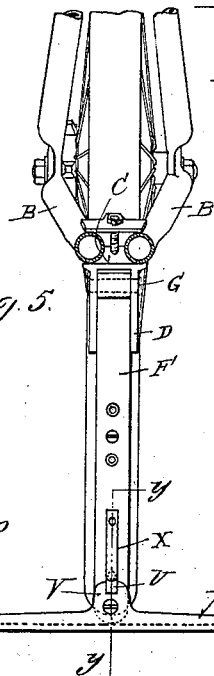
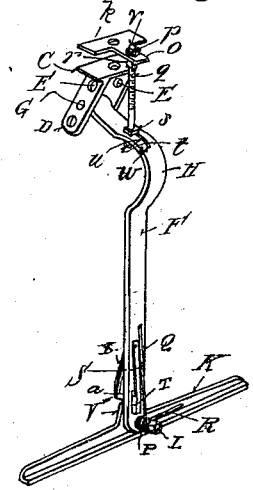
WITNESSES:
Jos. P. Dawley
W. M. McNair
INVENTOR.
John F. Williams
BY H. A. Toulmin
ATTORNEY.
THE NORRIS PETERS CO., PHOTO-LITHO., WASHINGTON, D. C.

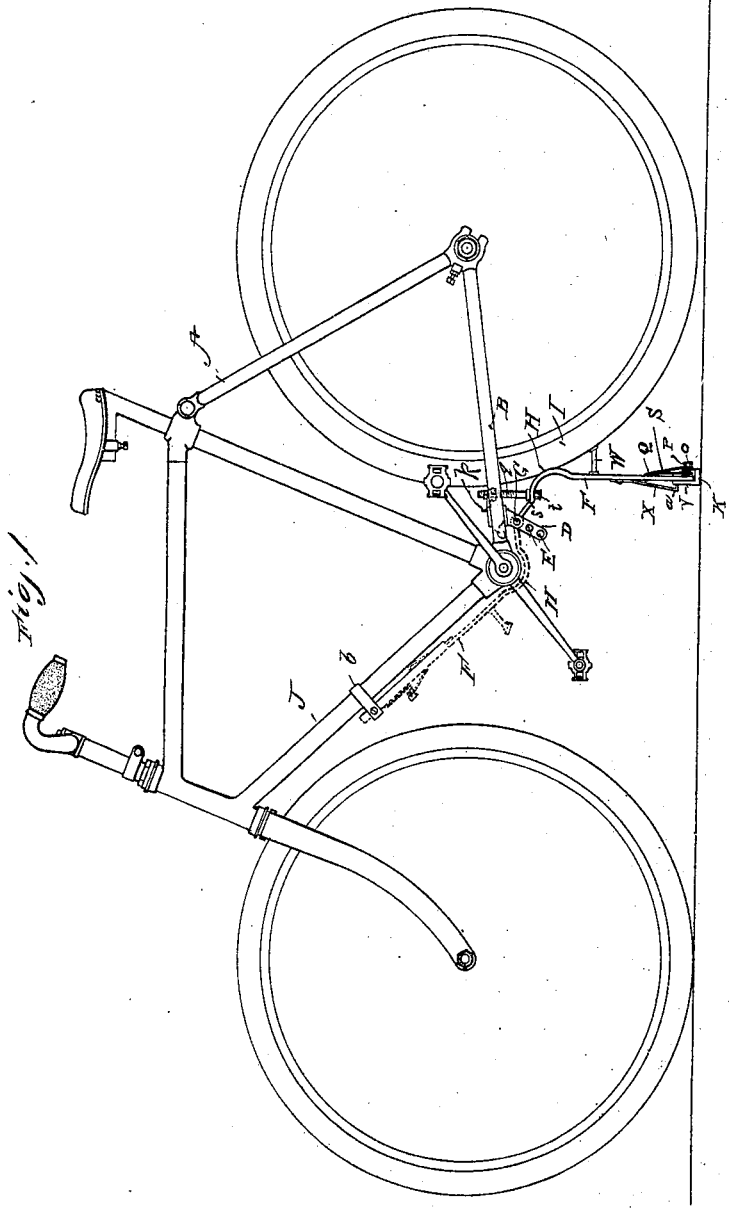

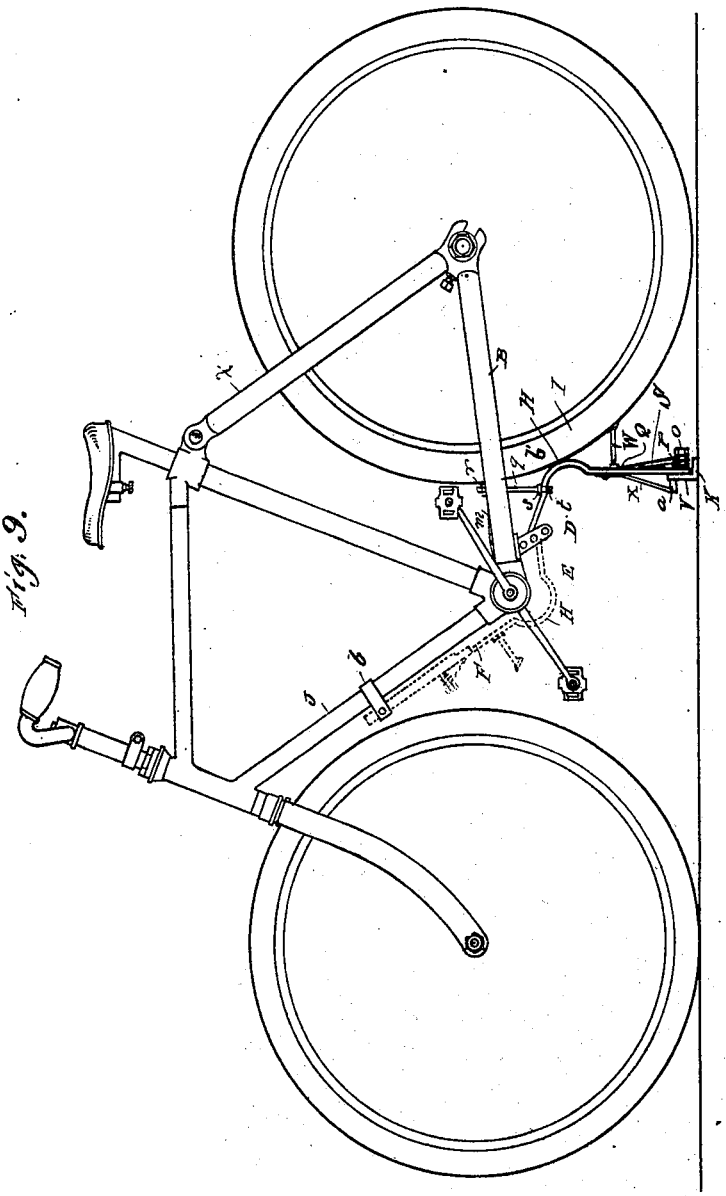

UNITED STATES PATENT OFFICE.

JOHN F. WILLIAMS, OF SANDUSKY, OHIO.

FOLDING BICYCLE-SUPPORT.

SPECIFICATION forming part of Letters Patent No. 670,125, dated March 19, 1901.

Application filed March 29, 1900. Serial No. 10,603. (No model.)

*To all whom it may concern:*

Be it known that I, JOHN F. WILLIAMS, a citizen of the United States, residing at Sandusky, in the county of Erie and State of Ohio, have invented certain new and useful Improvements in Folding Bicycle-Supports, of which the following is a specification, reference being had therein to the accompanying drawings.
This invention relates to certain new and useful improvements in folding bicycle-supports.

The general object of my invention is to provide a support which is adjustable to any style of bicycle and which may be folded into small compass and be secured to the frame structure when the bicycle is in use and which when in supporting position impinges against the rear wheel of the bicycle to hold it from moving, and at the same time has a lateral bearing when in holding position to maintain the wheel in a firm upright position.

Another object of my invention is to provide a pivoted ground-bar which is swung at right angles to a supporting-bar and firmly held in such position until released by a releasing device, when such ground-bar will automatically swing into line with said supporting-bar and engage with a supporting-clip preferably carried by the frame structure when thrown to its dotted-line position, as illustrated in Figures 1 and 2.

Another object of my invention is to provide a device whereby the supporting-bar may be locked in supporting position against the rear wheel.

My invention also relates to details of construction and arrangement hereinafter appearing and particularly pointed out in the claims.

In the accompanying drawings, on which like reference characters indicate corresponding parts, Fig. 1 represents a side elevation of a bicycle with my invention applied thereto and in supporting position; Fig. 2, a detail enlarged side view of a portion of the front and rear wheels and frame structure with my improvements applied thereto; Fig. 3, a sectional view on the line *x x* of Fig. 2 looking in the direction of the arrows; Fig. 4, a detail perspective view of the support proper ready for attaching to a bicycle-frame; Fig. 5, a detail view of the lower portion of my improved adjustable support; Fig. 6, a detail sectional view on the line *y y* of Fig. 3; Fig. 7, a detail side elevation of a supporting-clip for engaging with and supporting the ground-bar; Fig. 8, an edge view of the same; and Fig. 9, a similar view to Fig. 1, but showing the shank to which the support is attached in reverse position.

I am aware that numerous devices have been discovered for supporting a bicycle, but in none of such devices could it be said that the ground-bar would act to support the vehicle in a lateral direction, while when the supporting-bar was raised into the position in which it was supported against the frame, as when riding, the ground-bar would automatically aline itself with such frame structure and with the supporting-bar.

The letter A represents a bicycle of the ordinary construction. To the tubular bars B is attached my improved supporting device by means of a clip C, from which extends a shank D beneath the bar B and at an angle to such bar other than a right angle. The object of this angularity will hereinafter appear. It will be observed that the shank has a series of holes E therein. As illustrated in Figs. 3 and 4 particularly, it will be seen that the shank is bifurcated and that a supporting-bar F is pivoted therein by means of a pin G, which extends through one set of holes in the series of holes E. In all of the bicycles of the present day the crank-hanger is dropped below a line connecting the hubs of the two wheels, some having a greater drop than others. It is partly for this reason that I have provided a curved portion H in the supporting-bar, such latter portion being substantially concentric to the hanger when the supporting-bar is in the position indicated by dotted lines in Figs. 1 and 2, while when such supporting-bar is in the position indicated in full lines in said figures the curved portion constitutes a bearing for impinging against the rear wheel I of the bicycle. Should a frame have a less or greater drop than illustrated in the drawings, the supporting-bar may be adjusted in the bifurcated shank accordingly, so that the supporting-bar may lie in close proximity to the tubular bar J of the frame structure when folded. Upon the outer end of the supporting-bar F is mounted a ground-bar K by means of a bolt L. On the side of the supporting-bar opposite said ground-bar a sleeve M is mounted upon the bolt and is held in place between the supporting-bar and the outer end of the bolt by means of a nut O, which screws upon said bolt. About the sleeve M is coiled a spring P, one arm Q of which engages with the supporting-bar F, while its other arm R engages with the ground-bar K. The spring is put under torsion when the ground-bar is turned at right angles to the supporting-bar, and in order to hold said ground-bar in a supporting position—that is, at right angles to the supporting-bar—I provide a spring S, which carries a lug T for engaging with a notch U in the projection V on the ground-bar. This lug on the spring engages with the notch automatically the instant the ground-bar is turned at right angles to the supporting-bar. The bearing-surface H impinges against the rear wheel I when the support is in holding position, as indicated in Figs. 1 and 2. This prevents the rear wheel from rotating and at the same time the wheel is held off from the ground by the support, the ground-bar K holding the bicycle in an upright position. In order that the support may have an additional bearing against the rear wheel, I provide an auxiliary bearing-surface W, which projects from one side of the supporting-bar F and engages with such rear wheel. This auxiliary support may be omitted without departing from the spirit of my invention, it being used simply to increase the frictional contact between the supporting-bar and wheel.

Let it be supposed that a rider is about to mount his wheel. He first rolls the machine backward until the supporting-bar is thrown to such a position that the rear wheel rests on the ground, when he places his foot beneath the support and raises is until it assumes the position substantially as indicated by dotted lines in Figs. 1 and 2, such support being in line with the bar J of the frame structure of the bicycle. Such bar acts upon a spring X, which I will term a "releasing-spring" and which is mounted on the opposite side of the supporting-bar from the holding-spring S. This will cause the detent a to contact with the detent T and disengage it from the notch U in the ground-bar K. The instant the detent T is released from engagement with such bar the spring P will act to throw the ground-bar into alinement with the supporting-bar F, so that the bar will engage with a clip b, carried by the tubular bar J of the frame structure, in a manner presently to appear.

The clip b is formed of a strip of strap metal and near its outer ends has holes or openings therein, as shown at c, through which a bolt d is inserted to bind the nuts together, as illustrated in Fig. 8. In order to accomplish this, the strip metal is bent to form a loop which fits around the tubular bar J. From one side of the loop a supporting-spring e is struck up. This supporting-spring e extends downward from the loop portion of the clip and has a portion f bent at right angles thereto, while another portion g is bent upward from such portion f, also at right angles. This upright portion g has its end bent over and outward and slightly rounded, as shown at h. The bolt d extends through the downward projection of the spring-support and also through the upward projection g, and between such downward and upward projections is fitted a piece of rubber i upon the bolt d. A jam-nut holds the clip tightly bound upon the tubular bar J. This clip is so placed upon the tubular bar that when the ground-bar is rotated by the spring P into alinement with the supporting-bar and also into alinement with the bar J it will pass between the under side of the clip and the portion h of the supporting-spring and will rest upon the rubber i. This construction, as illustrated in Figs. 7 and 8 particularly, will hold the ground-bar in place, as also the supporting-bar, as illustrated in dotted lines in Figs. 1 and 2.

In some bicycles the distance between the hanger and the rear hub is much longer than in others. To adapt my support to the wheel in the proper position for the frictional surface H, as also the auxiliary frictional device W, to engage with the rear wheel, I sometimes find it necessary to reverse the position of the bifurcated hanger—that is, change it from the position in which it extends forward to a position in which it will extend backward. It is for this reason that the bifurcated hanger was made to extend forward of the vertical line passing through the center of said hanger. Thus with my invention I am not only enabled to accommodate my support to wheels having a long distance between the hanger and rear hub, but I am also enabled to adjust the hanger up and down within the bifurcated hanger to accommodate itself to the drop of the frame.

I will now refer to the means for locking my improved holder in contact with one of the wheels. It will be observed that a plate k, which constitutes a part of the bifurcated hanger and which is bolted to it and to the tubular bars B by means of a bolt m, has a rearward extension o with a hole p therein. A screw-threaded bolt q is adapted to extend through the rearward extension o. A jam-nut r is mounted upon the bolt q and is screwed up against the under side of the projection o. The lower end of such bolt has a shoulder s and an eye t formed therein. The eye is adapted to extend through a slot u in the supporting-bar F and to receive a lock 2 therein. By reason of placing the nut r against the under side of the projection o and another nut v against the upper side of such projection the bolt is held in position, so that when the support is in holding position such bolt will readily project through the slot $w$ in the supporting-bar.

It will be observed that the bolt $m$ has a nut $m'$ at its lower end. This is for the purpose of preventing ready access being had thereto when the supporting-bar is in holding position, so that it will be with great difficulty that the bifurcated bracket or hanger can be removed.

As here constructed the support may be folded into small compass and can be made very light, yet at the same time has sufficient strength to hold the wheel firmly in an upright position. The supporting-bar may also be adjusted in the bifurcated bracket or hanger to accommodate itself to a frame having more or less "drop" than that illustrated, while at the same time the locking device is also adjustable up and down by manipulating the nuts $r$ and $v$, respectively, to enable such locking device to engage with the supporting-bar no matter what the pivotal position of the supporting-bar may be with respect to the holes E.

Having thus fully described my invention, what I claim as new, and desire to secure by Letters Patent, is—

1. In a folding bicycle-support, the combination with a supporting-bar adapted to be pivotally connected with a bicycle-frame, of a ground-bar pivoted to said supporting-bar and adapted to be turned at a right angle to said supporting-bar, and also in alinement therewith, and means for holding said ground-bar in its angular position to support a bicycle, and means for releasing said ground-bar, whereby such bar may swing into alinement with the supporting-bar, and other means for holding the ground-bar and supporting-bar out of supporting position, all substantially as shown and described.

2. In a folding bicycle-support, the combination with a bicycle-frame, of a supporting-bar pivotally connected therewith, a pivoted ground-bar carried at the outer end of said supporting-bar, means for holding said ground-bar in such angular position, means for releasing said ground-bar, means for automatically throwing said ground-bar from its angular position into line with said supporting-bar, and a clip carried by the bicycle frame structure for engaging the outer end of said ground-bar as it comes into alinement with said supporting-bar, all substantially as shown and described.

3. In a folding bicycle-support, the combination with a bicycle-frame, of a bracket or hanger secured to said frame structure, a supporting-bar pivoted to said hanger, said supporting-bar having a curved portion therein for engaging with the rear wheel of said bicycle when in supporting position, a pivoted ground-bar mounted on the outer end of said supporting-bar having a notch at one side of its pivotal connection, a detent adapted to engage with said notch for holding said ground-bar at right angles to said supporting-bar, means carried by said supporting-bar for contacting with the frame structure of said bicycle when folding said support to disengage said detent from said notch, and means for automatically swinging said ground-bar into alinement with said supporting-bar when said detent is released, and a supporting-clip secured to the bicycle frame structure for engaging with and supporting said folding support, all substantially as shown and described.

4. In a folding bicycle-support, the combination with a bicycle-frame, of a bracket or hanger secured to said frame structure back of the bicycle crank-hanger, a supporting-bar pivotally connected with said bracket and having a bent portion concentric to said crank-hanger and another portion parallel to the forward and upward inclined tubular portion of said bicycle frame structure, a clip secured to said tubular portion of said frame structure and engaging with said folding support to hold said support out of supporting position, said curved portion of said supporting-bar constituting a bearing-surface adapted to contact with the rear wheel of said bicycle when said bar is in supporting position, all substantially as shown and described.

5. In a folding bicycle-support, the combination with a frame structure of a bicycle, of a reversible bracket secured to said frame structure back of the axle-hanger, said bracket having a shank adapted to extend either in a forward direction or in a backward direction, a supporting-bar pivoted to said bracket, a bearing-surface in said supporting-bar for contacting with the rear wheel of said bicycle, said shank having a series of holes, whereby said supporting-bar is adjustable to accommodate itself to the drop of the axle-hanger of the bicycle frame structure, a ground-bar pivoted to the outer end of said supporting-bar, a coiled spring having one end engaged with said supporting-bar and its other end engaged with said ground-bar for normally alining said ground-bar with said supporting-bar, said ground-bar having a notch in one of its sides, a spring-detent for engaging with said notch mounted on one side of such supporting-bar, a spring-detent mounted on the opposite side of said supporting-bar for engaging with said first detent and out of engagement with said ground-bar, said last-named detent adapted to come in contact with the frame structure to press upon said engaging detent to release said ground-bar, and a spring-clip secured to the frame structure for engaging with said ground-bar as it comes into alinement with said supporting-bar, all substantially as shown and described.

6. In a folding bicycle-support, the combination with a bicycle frame structure, of a reversible bifurcated hanger or bracket secured thereto, a supporting-bar adjustably mounted in said hanger, a bearing-surface in said supporting-bar for engaging with the rear wheel of said bicycle, an auxiliary bearing-surface projecting from said bar also for engaging with said rear wheel, a ground-bar pivoted near the outer end of said supporting-bar, a bolt constituting said pivot and extending beyond said supporting-bar, a sleeve mounted on said bolt, a spring coiled about said sleeve and having one of its ends engaging with said supporting-bar and its other end engaging with said ground-bar, a spring connected to one side of said supporting-bar, a lug formed at one end of said spring and normally engaging with a notch in said ground-bar when said ground-bar is at right angles to said supporting-bar, a spring carried upon the opposite side of said supporting-bar and also having a lug formed at one end for releasing said first-named lug from engagement with said ground-bar, so that said coiled spring will aline said ground-bar with said supporting-bar, a clip secured to said bicycle frame structure for normally engaging with said ground-bar when in alinement with said supporting-bar, all substantially as shown and described.

7. In a folding bicycle-support, the combination with an adjustable bracket, a supporting-bar pivotally mounted therein, said supporting-bar having a slot therein, a plate forming a portion of said bracket, a rearward extension from said plate having a hole or opening therein, a screw-threaded bolt adapted to extend through said hole and secured to said plate by nuts, said bolt having an eye formed at its lower end for extending through said slot to receive a lock, all substantially as shown and described.

8. In a folding bicycle-support, the combination with the bicycle frame structure, of a clip adapted to be secured thereto, a spring portion struck up from said clip, a bolt for extending through said spring portion and through the ends of said clip and acting to bind said clip to said frame structure, said spring portion acting to receive and support the folding bicycle-support, all substantially as shown and described.

9. In a folding bicycle-support, the combination with a bicycle-frame, of a bracket secured thereto having a plate forming a part thereof, an extension projecting from said plate having a hole or opening therein, a supporting-bar pivotally connected with said bracket and having a slot therein, an adjustable device for extending through the hole in said plate extension and also through the slot in said supporting-bar, and means for securing said device to said plate and for locking said device to said supporting-bar, all substantially as shown and described.

10. In a folding bicycle-support, the combination with the bicycle frame structure, a clip having a spring struck up therefrom, lateral projections from each side of said clip and adapted to be bent inward to complete a circular loop, the free ends of said clip having holes or openings therein, a bolt adapted to pass through said spring in two places and through the ends of said loop, a nut for tightening said clip upon said frame structure, and an elastic thimble mounted upon said bolt within said struck-up spring, said spring acting as a support for the bicycle-support and said thimble preventing rattling between said spring and support, all substantially as shown and described.

11. In a folding bicycle-support, the combination with a bicycle-frame, of a supporting-bar connected therewith and capable of moving into contact with the rear wheel of said bicycle, a ground-bar pivotally connected therewith and adapted to be moved at right angles thereto, means for holding said ground-bar out of alinement with said supporting-bar, and means for automatically returning said ground-bar into alinement with said supporting-bar when said holding means is disengaged.

In testimony whereof I affix my signature in presence of two witnesses.

JOHN F. WILLIAMS.

Witnesses:
   CHAS. A. BLACKFORD,
   THEODORE GERALD.